US005774697A

United States Patent [19]

Hall

[11] Patent Number: 5,774,697
[45] Date of Patent: Jun. 30, 1998

[54] DATA REALIGNMENT METHOD AND APPARATUS

[75] Inventor: Trevor Hall, Glossop, England

[73] Assignee: International Computers Limited, London, England

[21] Appl. No.: 704,393

[22] Filed: Aug. 27, 1996

[30] Foreign Application Priority Data

Oct. 11, 1995 [GB] United Kingdom ................... 9520824

[51] Int. Cl.⁶ ..................................................... G06F 9/315
[52] U.S. Cl. ................ 395/500; 395/200.18; 364/715.08
[58] Field of Search ..................................... 395/500, 578, 395/200.18; 364/715.08

[56] References Cited

U.S. PATENT DOCUMENTS

| | | | |
|---|---|---|---|
| 4,370,641 | 1/1983 | Kantor et al. | 340/146.3 |
| 4,769,790 | 9/1988 | Yamashita | 365/189 |
| 4,984,251 | 1/1991 | Perloff et al. | 375/38 |
| 5,168,561 | 12/1992 | Vo | 395/425 |
| 5,297,242 | 3/1994 | Miki | 395/425 |
| 5,392,406 | 2/1995 | Petersen et al. | 395/325 |
| 5,406,554 | 4/1995 | Parry | 370/58.1 |
| 5,463,748 | 10/1995 | Schwendinger | 395/375 |
| 5,465,340 | 11/1995 | Creedon et al. | 395/876 |
| 5,513,364 | 4/1996 | Nishikawa | 395/287 |
| 5,517,627 | 5/1996 | Petersen | 395/311 |
| 5,568,443 | 10/1996 | Dixon et al. | 365/230.05 |
| 5,619,658 | 4/1997 | Priem et al. | 395/280 |

FOREIGN PATENT DOCUMENTS

WO 95/06285  3/1995  WIPO.

OTHER PUBLICATIONS

MicrosoftPress, Computer Dictionary, p. 60, Doyle et al., 1993.

*Primary Examiner*—Kevin J. Teska
*Assistant Examiner*—Russell W. Frejd
*Attorney, Agent, or Firm*—Lee, Mann, Smith McWilliams, Sweeney & Ohlson

[57] ABSTRACT

Apparatus is described for realigning a sequence of data bytes, such as a received datagram. The data is initially written into a multi-lane FIFO buffer, with the data in each lane pre-skewed by a controllable amount, determined by the address of the buffer area into which the data is to be transferred. The data is then read out of the FIFO buffer through a lane changer which rotates the order of the lanes by a controllable amount, also determined by the address of the buffer area. The apparatus can be used, for example, to realign data to ensure that the data is correctly aligned with cache line boundaries.

9 Claims, 7 Drawing Sheets

DATA REALIGNMENT METHOD AND APPARATUS

BACKGROUND OF THE INVENTION

This invention relates to a data realignment method and apparatus for use in a computer system.

In computer systems, it is frequently necessary to transfer data from one memory into an allocated area in another memory. Transfers may be performed in fixed-size blocks, which may for example correspond to a cache line size. If the area into which the data is to be transferred is aligned with these fixed blocks, there is no problem. However, if the area is not so aligned, it will be necessary to realign the data before transfer. One possible realignment technique might be to use a barrel shifter. Another possibility might be to read the data a byte at a time and then to write it back in the required alignment. However, these methods of realigning data tend to have performance and/or complexity penalties.

The object of the present invention is to provide a novel data realignment method and apparatus which does not suffer from these penalties.

SUMMARY OF THE INVENTION

According to the invention there is provided apparatus for realigning a sequence of data bytes, comprising:
(a) a FIFO buffer, having a plurality of lanes;
(b) pre-skewing means, for writing a plurality of input data bytes in parallel into the lanes of FIFO buffer with the bytes in each lane pre-skewed by a controllable amount relative to those in the other lanes; and
(c) lane changing means for rotating the order of the lanes on reading data out of the FIFO.

DESCRIPTION OF AN EMBODIMENT OF THE INVENTION

One embodiment of the invention will now be described by way of example with reference to the accompanying drawings.

System Level Description

Figure 1:
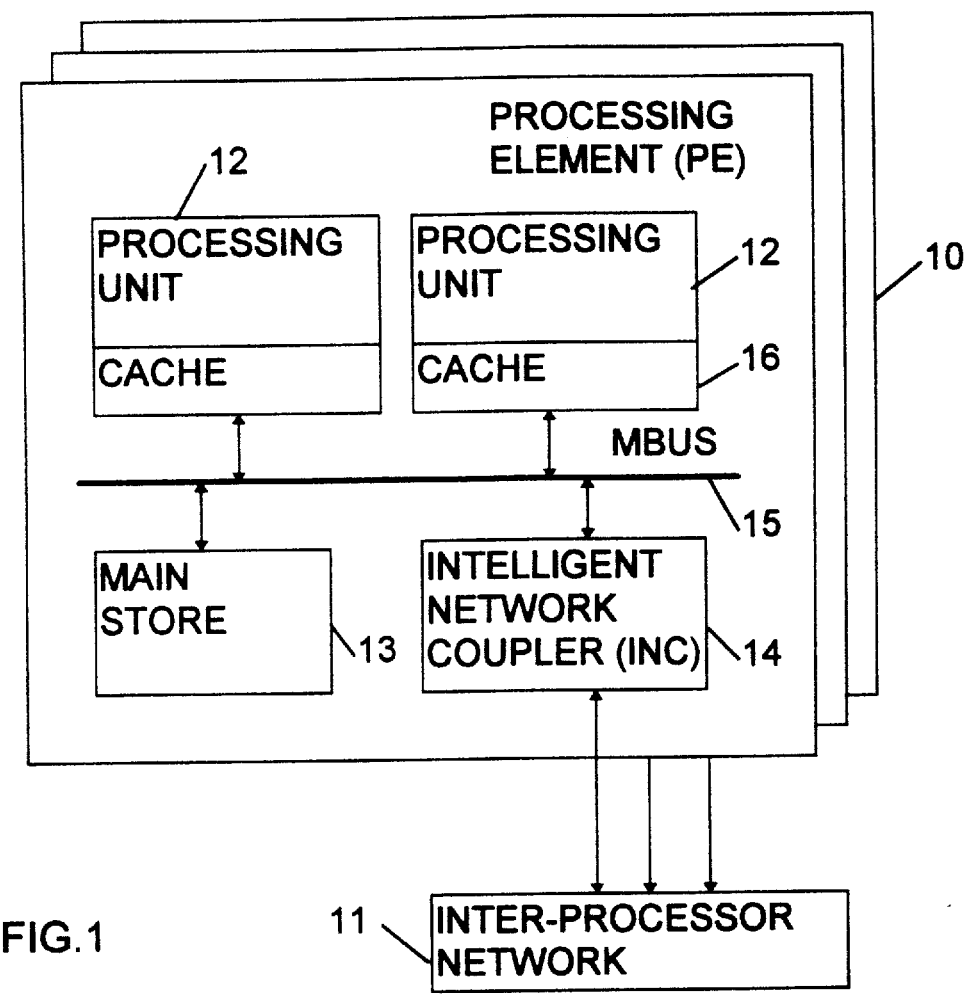
FIG. 1 is a block diagram of a computer system embodying the invention.

FIG. 1 shows a data processing system, comprising a plurality of processing elements (PEs) 10, interconnected by an inter-processor network 11. Each PE comprises a plurality of processing units 12, a main store 13, and an intelligent network coupler (INC) 14, interconnected by a 64-bit bus 15. Each processing unit 12 comprises a HyperSPARC chip, and includes a cache 16. The bus 15 is an MBus. (SPARC is a trademark of SPARC International).

The processing units 12 share data held in the main store 13. The caches 16 hold copies of this shared data, to allow rapid access by the processors. The cache line size is 32 bytes. Conventional cache coherency mechanisms are used to ensure that the copies held in the caches are kept consistent with each other, and with the main store. All coherent transfers over the MBus are in blocks of 32 bytes (i.e. one cache line).

The processing units can communicate with each other over the inter-processor network by sending messages referred to herein as datagrams. Each datagram has a minimum length of 16 bytes and a maximum length of 8 Megabytes.

Intelligent Network Coupler (INC)

Figure 2:
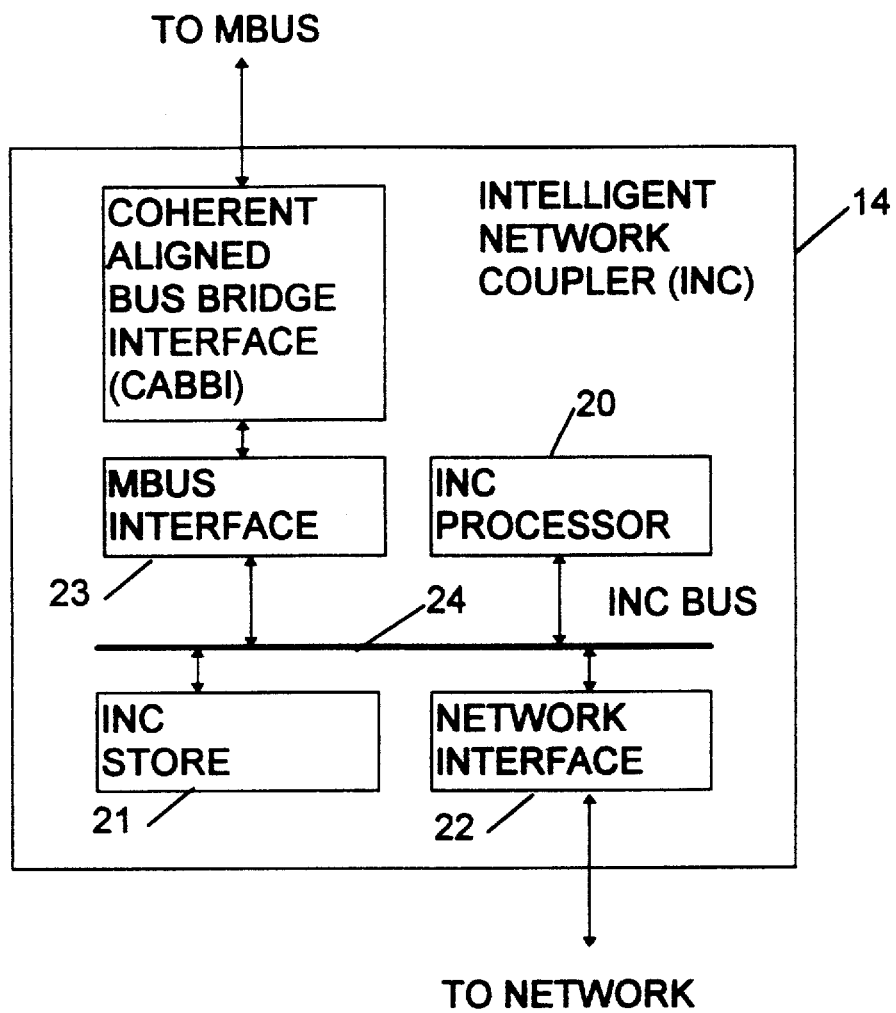
FIG. 2 is a block diagram showing an Intelligent Network Coupler (INC) in more detail.

FIG. 2 shows the INC 14 in more detail. The INC comprises an INC processor 20, an INC store 21, a network interface 22, and an MBus interface 23, interconnected by a 32-bit wide bus 24, referred to as the INC bus. The INC store 21 has a 32-bit word width. The network interface 22 connects the INC bus to the network 11. The MBus interface 23 is connected to the MBus 15 by way of a coherent aligned bus bridge interface (CABBI) 25.

In operation, when the network interface 22 receives a datagram from the inter-processor network, it stores the datagram in the INC store 21, starting on a 32-bit word boundary. The INC processor 20 then makes an upcall to one of the processing units 12, requesting it to allocate buffer space for receiving the datagram. The processing unit responds to this by allocating the necessary buffer space in the main memory, and returning the virtual address (VA) and physical address (PA) of the start of the buffer.

The allocated buffer space does not necessarily start and end on cache line boundaries: it may start and end at any byte location within a cache line. Therefore, it can be seen that the first and last cache lines of the allocated buffer space may contain existing data, outside the buffer space, that must not be overwritten by the transferred data. The purpose of the CABBI, as will be described, is to ensure correct byte alignment of the data when it is written into the buffer over the MBus, and to ensure that existing data outside the allocated buffer space is not overwritten.

Coherent Aligned Bus Bridge Interface (CABBI)

Figure 3:
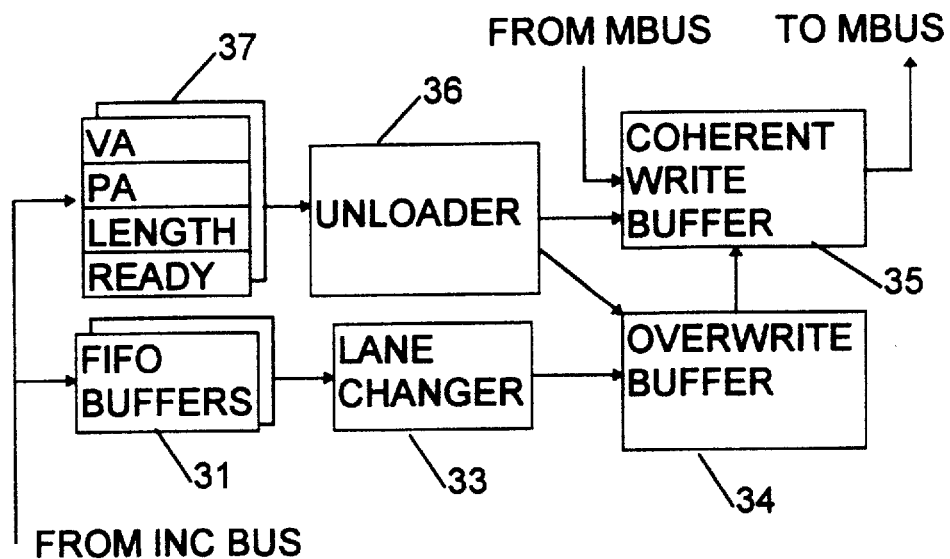
FIG. 3 is a block diagram showing a Coherent Aligned Bus Bridge Interface (CABBI), forming part of the INC, in more detail.

FIG. 3 shows the CABBI 25 in more detail. The CABBI comprises two first-in-first-out (FIFO) buffers 31, a lane changer 33, a 32-byte overwrite buffer 34, a 32-byte coherent write buffer 35, and an unloader circuit 36.

The two FIFO buffers are normally used alternately: while one is having data written into it from the INC bus, the other is being unloaded. Each of the FIFO buffers has associated control registers 37 which hold the following items:

VA: The virtual address of the start of the main store buffer area to which data is to be transferred.

PA: The physical address of the start of the main store buffer area to which data is to be transferred.

LENGTH: the number of data bytes in the FIFO waiting to be transferred.

BUFFER READY: a flag which, when true, indicates that the writing to the FIFO buffer is complete, and it is ready to be unloaded. Conversely, when this flag is false, the FIFO buffer has been unloaded and so is ready to receive data.

When it is ready to initiate a transfer of data from the INC store 21 to the main store 13, the INC processor 20 polls the BUFFER READY flags of the FIFO buffers 31, to determine which is ready to receive data. If one of the BUFFER READY flags is false, that buffer is selected for writing. (If both are false, either one is selected). The INC processor first writes the physical and virtual addresses PA, VA of the start of the allocated buffer area into the PA and VA registers of the selected FIFO buffer. The INC processor then performs a series of direct memory access (DMA) operations, to write the data, using 128-byte block transfers, into this FIFO buffer. The INC processor then writes the data length (in bytes) into the LENGTH register, and sets that FIFO's BUFFER READY flag. As will be described, setting of this flag triggers the unloader 36 into reading out the data from the FIFO, and transferring it to the MBus.

If the datagram size is larger than 512 bytes, the INC processor divides the datagram into sections of 512 bytes, and writes one section at a time into the FIFO. After writing each section, the INC processor waits until BUFFER READY goes true. It then increments the addresses PA, VA by 512, and writes the next section into the FIFO.

Figure 4:
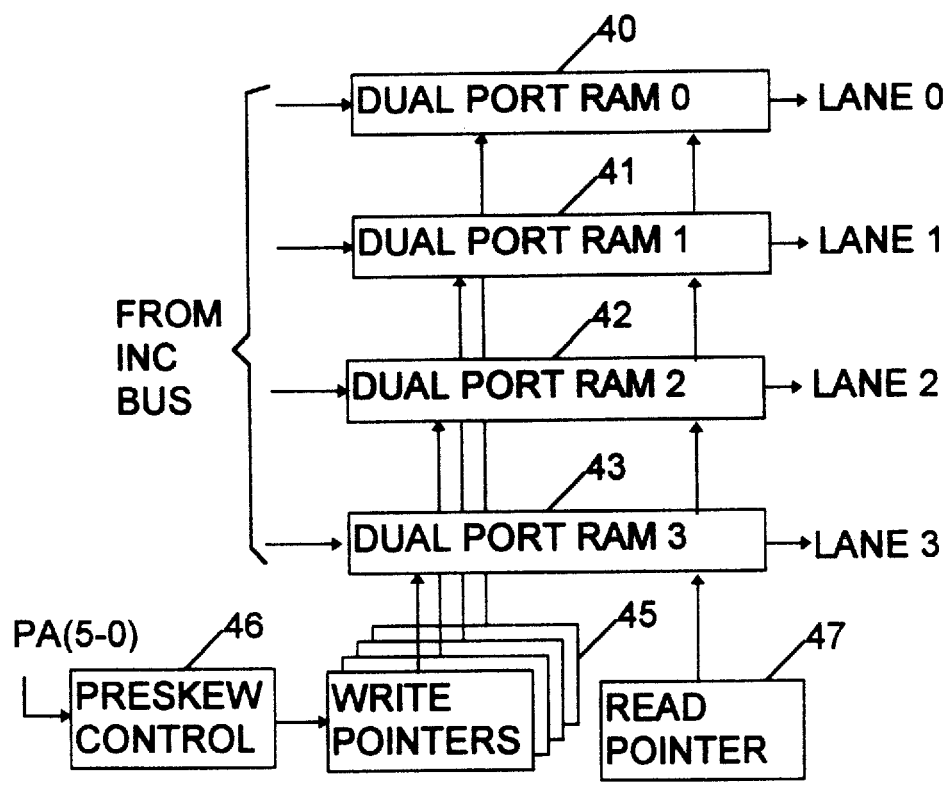
FIG. 4 is a block diagram showing a first-in first-out (FIFO) buffer, forming part of the CABBI, in more detail.

One of the FIFO buffers 31 is shown in more detail in FIG. 4. The FIFO is split into four byte-wide lanes, formed by four 136×1 byte dual-port memories 40–43. Data from the INC bus can be written into these four memories from the INC bus, four bytes at a time in parallel. Data can be independently read out of the four memories, four bytes at a time in parallel.

The four memories 40–43 are addressed by four separate write pointers 45, so that a different byte location can be addressed in each memory. Initially, each of the write pointers is set to a pre-skew (or offset) value, equal to or greater than 0. Then, as each input word is written into the buffer, all four write pointers are incremented by one.

The pre-skew values are calculated by means of a pre-skew control circuit 46 from the value of the six least significant bits PA(5–0) of the physical address register PA, in accordance with the following truth table.

| PA(5-0) | Pre-skew values | | | |
|---|---|---|---|---|
| 0  | 0 | 0 | 0 | 0 |
| 1  | 0 | 0 | 0 | 1 |
| 2  | 0 | 0 | 1 | 1 |
| 3  | 0 | 1 | 1 | 1 |
| 4  | 1 | 1 | 1 | 1 |
| 5  | 1 | 1 | 1 | 2 |
| 6  | 1 | 1 | 2 | 2 |
| 7  | 1 | 2 | 2 | 2 |
| 8  | 2 | 2 | 2 | 2 |
| 9  | 2 | 2 | 2 | 3 |
| 10 | 2 | 2 | 3 | 3 |
| 11 | 2 | 3 | 3 | 3 |
| 12 | 3 | 3 | 3 | 3 |
| 13 | 3 | 3 | 3 | 4 |
| 14 | 3 | 3 | 4 | 4 |
| 15 | 3 | 4 | 4 | 4 |
| 16 | 4 | 4 | 4 | 4 |
| 17 | 4 | 4 | 4 | 5 |
| 18 | 4 | 4 | 5 | 5 |
| 19 | 4 | 5 | 5 | 5 |
| 20 | 5 | 5 | 5 | 5 |
| 21 | 5 | 5 | 5 | 6 |
| 22 | 5 | 5 | 6 | 6 |
| 23 | 5 | 6 | 6 | 6 |
| 24 | 6 | 6 | 6 | 6 |
| 25 | 6 | 6 | 6 | 7 |
| 26 | 6 | 6 | 7 | 7 |
| 27 | 6 | 7 | 7 | 7 |
| 28 | 7 | 7 | 7 | 7 |
| 29 | 7 | 7 | 7 | 8 |
| 30 | 7 | 7 | 8 | 8 |
| 31 | 7 | 8 | 8 | 8 |

Figure 6:
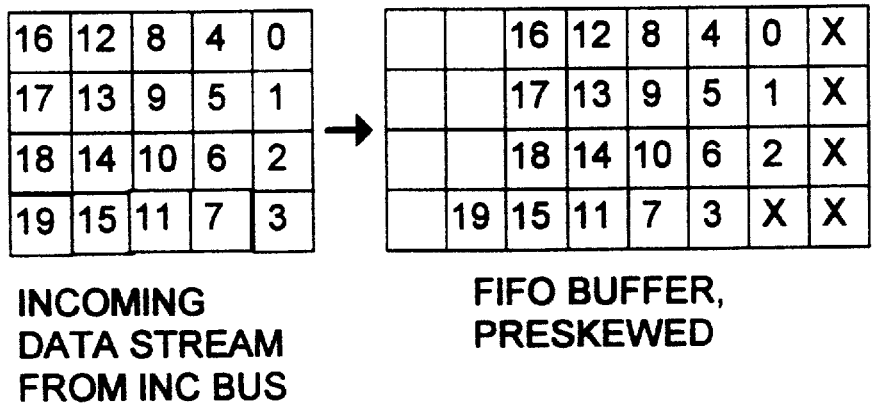
FIG. 6 is a schematic diagram showing an example of the way in which data is pre-skewed in the FIFO buffer.

FIG. 6 shows an example of pre-skewing the data in this way. In this example, it is assumed that PA(5–0) equals 5, indicating that the start of the buffer area is at byte 5 of the cache line. As indicated in the above table, in this case the four write pointers are initially given respective pre-skew values of 1,1,1 and 2. Therefore, the first four input data bytes (bytes 0–3) are placed in locations 1,1,1 and 2 respectively of the four memories 40–43. After the write pointers are incremented, the next four input data bytes (bytes 4–7) are placed in locations 2,2,2 and 3 respectively of the four memories, and so on.

The four memories 40–43 are addressed by a single read pointer 47, so that all four memories receive the same read address. Initially, the read pointer is set to zero. Then, after each read, the read pointer is incremented by one. The four bytes read from the memories are fed in parallel to the lane changer 33.

The lane changer 33 has four byte-wide input lanes and four byte-wide output lanes. The four input lanes respectively receive the bytes read out of the four memories 40–43. The lane changer is a switching device, having four states, as illustrated in FIGS. 5a–5d. The state of the lane changer is controlled by the six least significant bits PA(5–0) of the physical address register PA, as follows.

Figure 5A:
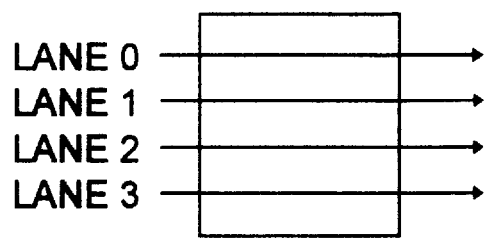
FIGS. 5a–5d are schematic diagrams illustrating the states of a lane changer circuit forming part of the CABBI.

If PA(5–0) equals 0,4,8,12,16,20,24, or 28 the lane changer is set to the state shown in FIG. 5a. In this state, the lane changer connects each of its input lanes to the corresponding output lane.

Figure 5B:
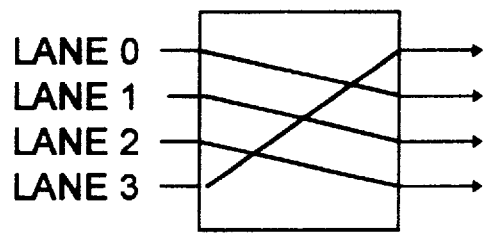

If PA(5–0) equals 1,5,9,13,17,21,25, or 29 the lane changer is set to the state shown in FIG. 5b. In this state, the lane changer rotates the lanes by one position.

Figure 5C:
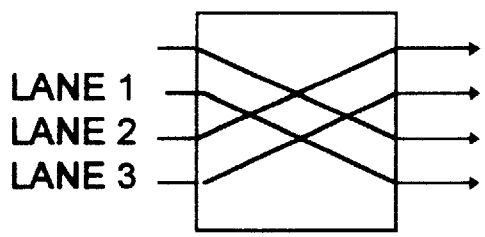

If PA(5–0) equals 2,6,10,14,18,22,26, or 30 the lane changer is set to the state shown in FIG. 5c. In this state, the lane changer rotates the lanes by two positions.

Figure 5D:
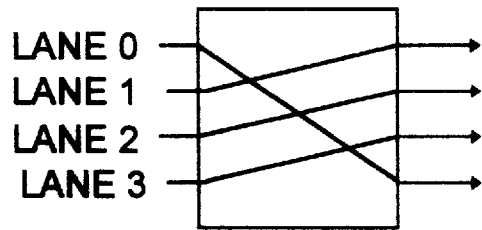

If PA(5–0) equals 3,7,11,15,19,23,27, or 31 the lane changer is set to the state shown in FIG. 5d. In this state, the lane changer rotates the lanes by three positions.

The output of the lane changer 33 is fed to the input of the overwrite buffer 34. The overwrite buffer holds a 32-byte block, corresponding to one cache line. This is organised as 4 locations, each of which holds 8 bytes (64 bits), corresponding to the width of the MBus. The 4-byte (32 bit) output from the lane changer is directed alternately into the upper and lower halves of the overwrite buffer. Thus, the first 4 bytes output from the lane changer are stored in the upper half of location 0 of the overwrite buffer, the next 4 bytes are stored in the lower half of location 0, the next 4 bytes are stored in the upper half of location 1, and so on.

Figure 7:
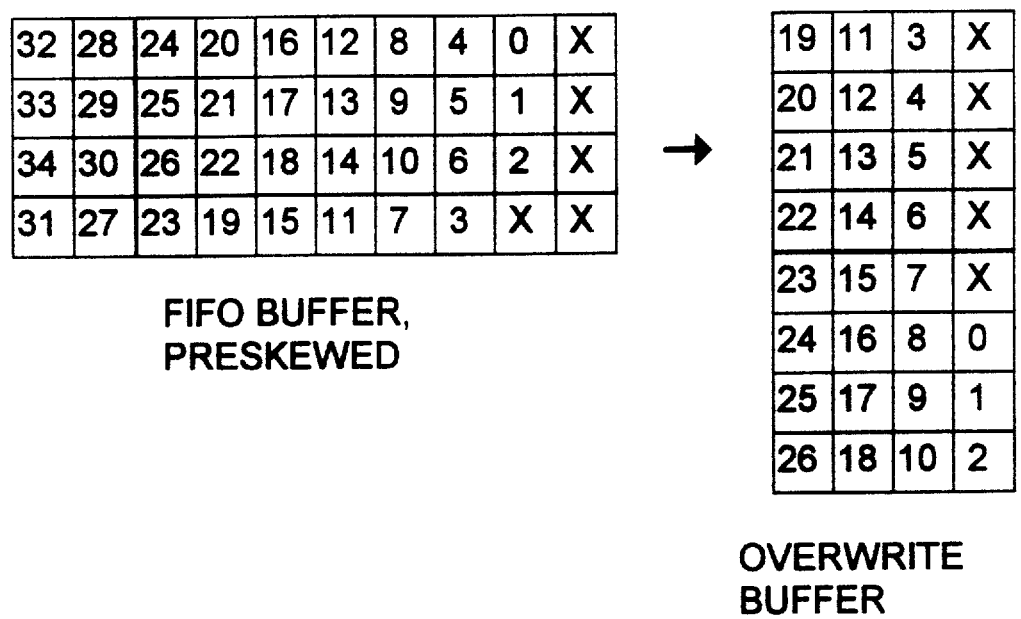
FIG. 7 is a schematic diagram showing an example of operation of the lane changer.

FIG. 7 continues the example of FIG. 6 above, by showing the way the pre-skewed data in the data buffer is transferred into the overwrite buffer. It was assumed in this example that PA(5–0) equals 5, and so the lane changer will be set in its second state, as shown in FIG. 5b. The data is therefore rotated by one lane position before being written into the overwrite buffer. The result, as shown in FIG. 7, is that data bytes 0–26 are loaded in the correct order into the 27 most significant byte positions of the overwrite buffer.

The five least significant byte positions contain "garbage", as indicated by "X".

It can be seen that the net result of the pre-skewing and lane changing is to correctly align the data within the overwrite buffer, to take account of the byte position of the start of the data within the 32-byte cache line.

The overwrite buffer 34 is connected to the coherent write buffer 35 by a 32-byte wide path, which allows the contents of the overwrite buffer to be transferred to the coherent write buffer in a single operation. The transfer is controlled by a 32-bit mask OVERWRITE(31–0). If bit OVERWRITE(n) is true, this indicates that byte n of the coherent write buffer is to be overwritten with the corresponding byte of the overwrite buffer; otherwise it is to be left unchanged.

The coherent write buffer 35 is connected to the MBus. As will be described, the unloader 36 can initiate a coherent read and invalidate operation, so as to read the existing contents of a cache line into the coherent write buffer. Then, the unloader can initiate transfer of the contents of the overwrite buffer into the coherent write buffer, using a 32-bit mask OVERWRITE(31–0). As will be described, the unloader sets the OVERWRITE mask to a pattern which ensures that any existing data in a cache line, outside the allocated buffer area, is not overwritten. The unloader can then initiate a coherent write and invalidate operation over the MBus, to write the 32-byte block into the main store via the cache.

Unloader

Figure 8:
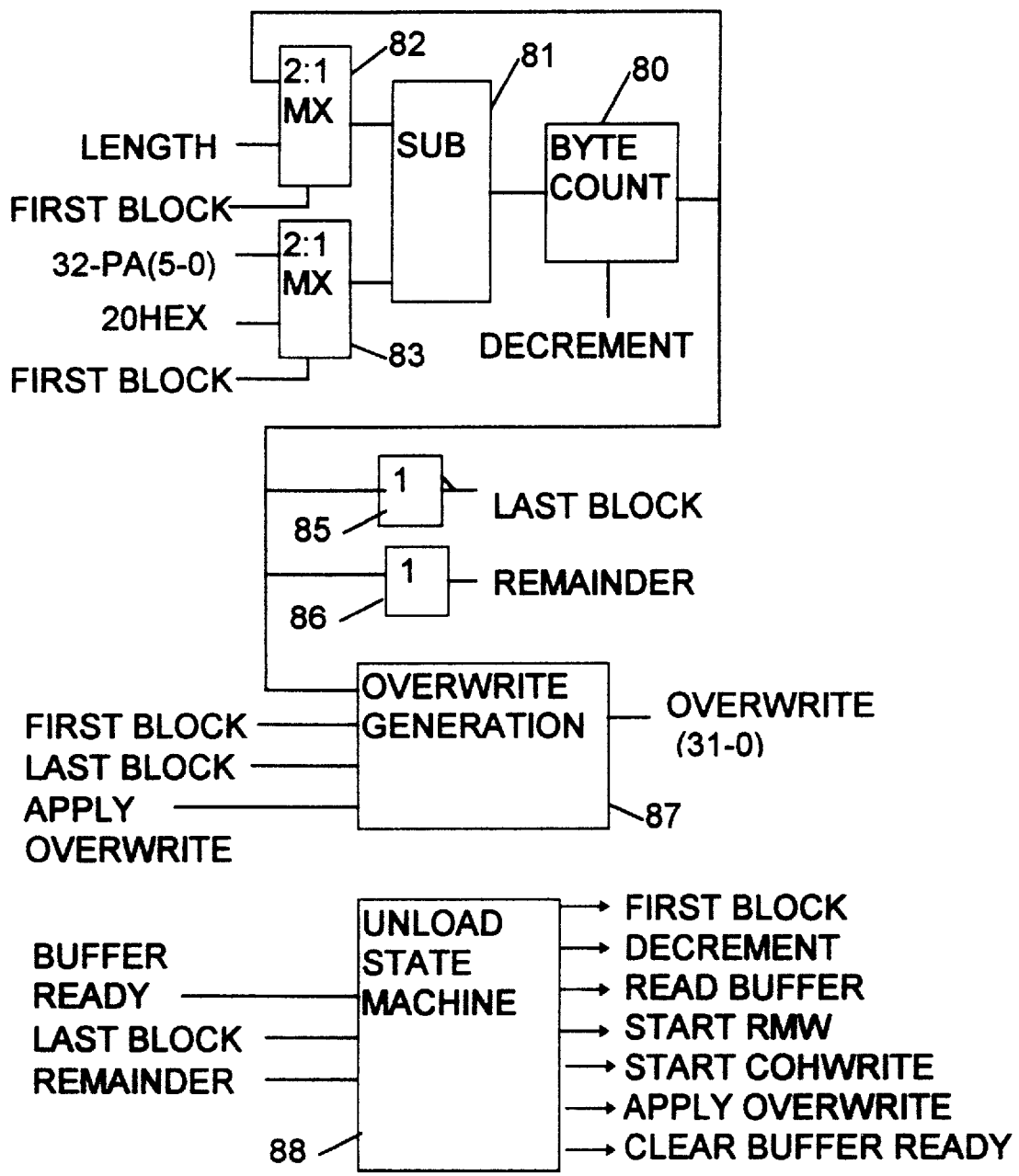
FIG. 8 is a block diagram showing an unloader circuit, forming part of the CABBI, in more detail.

FIG. 8 shows the unloader 36 in more detail. The unloader includes an 8-bit BYTE COUNT register 80, having a write enable input controlled by a DECREMENT signal. The BYTE COUNT register receives the output of a subtractor circuit 81. The minuend input of the subtractor receives the output of a 2:1 multiplexer 82, and the subtrahend input of the subtractor receives the output of a 2:1 multiplexer 83. Both multiplexers are controlled by a FIRST BLOCK signal. When FIRST BLOCK is true, the multiplexer 82 selects the LENGTH value from the registers 37, which indicates the number of data bytes to be transferred, while the multiplexer 83 selects a value equal to 32 minus PA(5–0), which is equal to the number of bytes in the first block of the data. When FIRST BLOCK is false, the multiplexer 82 selects the output of the BYTE COUNT register, while the multiplexer 83 selects a preset value 32 (20HEX).

Thus, it can be seen that, when FIRST BLOCK is true, the BYTE COUNT register is loaded with a value equal to the data length minus the number of bytes transferred in the first (possibly partial) block. Then, after each subsequent transfer over the MBus, the BYTE COUNT is decremented by 32. In this way, the BYTE COUNT keeps track of the number of data bytes still to be transferred.

The three most significant bits of the BYTE COUNT are fed to a NOR gate 85, which produces a LAST BLOCK signal. It can be seen that LAST BLOCK goes true when the BYTE COUNT is less than 32, indicating that there is less than one 32-byte block still to be transferred.

The five least significant bits of the BYTE COUNT are fed to an OR gate 86 which produces an output signal REMAINDER. If LAST BLOCK and REMAINDER are both true, this indicates that there is a partial block (less than 32 bytes) still waiting to be transferred.

The unloader also includes an overwrite control circuit 87, which generates the 32-bit overwrite mask pattern OVERWRITE(31–0) which controls the transfer of data between the overwrite buffer and the coherent write buffer, for the first and last blocks.

The OVERWRITE pattern is generated as follows. For the first 32-byte block of the data, the OVERWRITE pattern is derived from the six least significant bits of the physical address PA(5–0) of the start of the buffer area, according to the following truth table:

| PA(5-0) | OVERWRITE(31-0) |
|---|---|
| 0 | 11111111111111111111111111111111 |
| 1 | 11111111111111111111111111111110 |
| 2 | 11111111111111111111111111111100 |
| 3 | 11111111111111111111111111111000 |
| 4 | 11111111111111111111111111110000 |
| 5 | 11111111111111111111111111100000 |
|  | etc. |
| 27 | 11111000000000000000000000000000 |
| 28 | 11110000000000000000000000000000 |
| 29 | 11100000000000000000000000000000 |
| 30 | 11000000000000000000000000000000 |
| 31 | 10000000000000000000000000000000 |

For the last 32-byte block, the OVERWRITE pattern is derived from the current BYTE COUNT value according to the following truth table:

| BYTE COUNT | OVERWRITE(31-0) |
|---|---|
| 0 | 00000000000000000000000000000000 |
| 1 | 00000000000000000000000000000001 |
| 2 | 00000000000000000000000000000011 |
| 3 | 00000000000000000000000000000111 |
| 4 | 00000000000000000000000000001111 |
| 5 | 00000000000000000000000000011111 |
|  | etc. |
| 27 | 00000111111111111111111111111111 |
| 28 | 00001111111111111111111111111111 |
| 29 | 00011111111111111111111111111111 |
| 30 | 00111111111111111111111111111111 |
| 31 | 01111111111111111111111111111111 |

For all other 32-byte blocks, i.e. other than the first and last blocks of the data, the OVERWRITE pattern is set to all-ones.

It can be seen that these mask patterns are such as to ensure that, if the first and last 32-byte blocks of the allocated buffer area are not aligned with the cache line boundaries, any existing data in the cache line, outside the allocated buffer area, will not be overwritten by the data, and so will be preserved.

Continuing the example given in FIG. 7, it was assumed that PA(5–0)=5, and so the OVERWRITE pattern for the first 32-byte block will be 11111111111111111111111111100000. The coherent write buffer will therefore be overwritten by all the bytes in the overwrite buffer, except for the five least significant bytes. In other words, data bytes 0–26 in FIG. 7 are transferred, while the "garbage" bytes (X) are discarded.

The unloader also includes a state machine 88, which performs the overall control of transfers. The state machine receives the BUFFER READY, LAST BLOCK, and REMAINDER signals as input, and produces the following output signals:

FIRST BLOCK: indicates the first 32-byte block of the data.

DECREMENT: decrement the BYTE COUNT register.

READ BUFFER: read from the FIFO buffer 31.

START RMW: start a read/modify/write cycle on the MBus.

START COHWRITE: start a coherent write cycle on the MBus.

APPLY OVERWRITE: overwrite the coherent write buffer 35 with the contents of the overwrite buffer 34.

CLEAR BUFFER READY: clear the BUFFER READY signal.

Operation of the unloader

Figure 9:
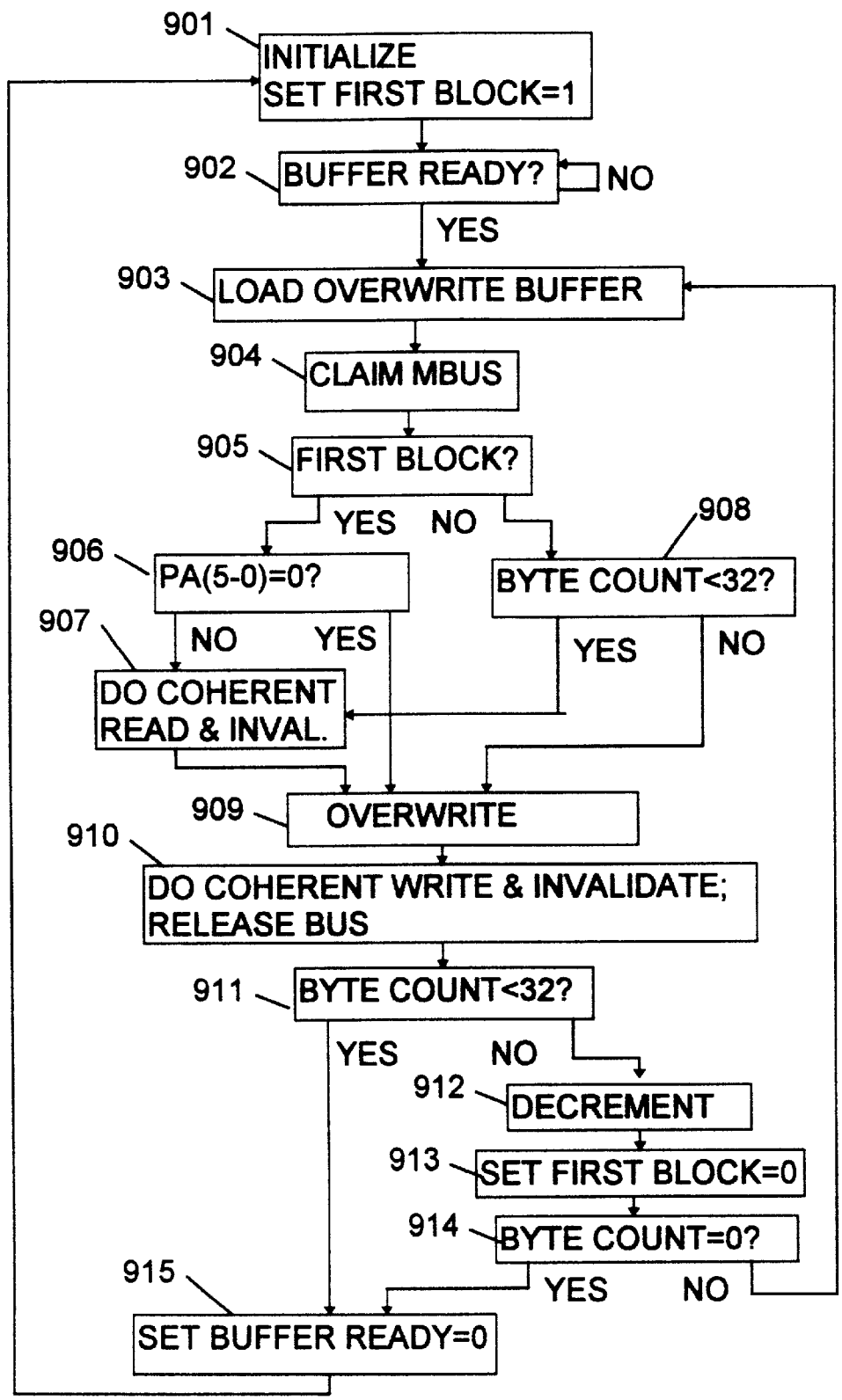
FIG. 9 is a flow chart, showing the operation of the unloader.

FIG. 9 is a flowchart showing the operation of this state machine 88.

(Step 901) The unloader sets the FIRST BLOCK signal to 1.

(Step 902) The unloader then waits in a loop, while data is loaded into one of the FIFO buffers 31. As described above, the data loaded into the FIFO is pre-skewed, by an amount dependent on the physical address of the start of the buffer area. The unloader remains in this loop until that FIFO's BUFFER READY flag goes true, indicating that loading of the FIFO buffer is complete. When BUFFER READY is true, the unloader proceeds to Step 903.

(Step 903) The unloader generates a series of READ BUFFER signals to transfer a 32-byte block of data into the overwrite buffer 34 from the FIFO buffer 31.

(Step 904) The unloader then claims the MBus, by sending a bus request signal on to the bus, and waiting until it receives a bus grant signal.

(Step 905) The unloader then checks whether the FIRST BLOCK signal is true. If FIRST BLOCK is true (indicating that this is the first 32-byte block of the data), the unloader proceeds to Step 906; otherwise it proceeds to Step 908.

(Step 906) The unloader checks whether the value of PA(5–0) is zero. A non-zero value of PA(5–0) indicates that the start of the buffer area is not aligned with a cache line boundary, and so the first cache line of the buffer area may contain existing data that is not to be overwritten. If PA(5–0) is non-zero, the unloader proceeds to Step 907; otherwise, it proceeds directly to Step 909.

(Step 907) The unloader performs a coherent read and invalidate, so as to read the existing contents of the cache line into the coherent write buffer 35. It then proceeds to Step 909.

(Step 908) If it is found at Step 905 that FIRST BLOCK is false, the unloader checks whether the BYTE COUNT is less than 32 (i.e. LAST BLOCK and REMAINDER are both true), indicating that this is the last 32-byte block, and the end of the block is not aligned with a cache line boundary. If so, the unloader proceeds to Step 907; otherwise, the unloader proceeds to Step 909.

(Step 909) The unloader the generates an APPLY OVERWRITE signal, to transfer the contents of the overwrite buffer 34 to the coherent write buffer 35, using the OVERWRITE mask pattern to determine which bytes of the coherent write buffer are to be overwritten.

(Step 910) The unloader then performs a coherent write and invalidate operation, to transfer the data block in the coherent write buffer over the MBus to the allocated buffer area in the main store. The unloader then releases the MBus.

(Step 911) The unloader then checks whether the BYTE COUNT is less than 32, indicating that this is the last block, and the end of the block is not aligned with a cache line boundary. If so, the unloader proceeds to Step 915; otherwise, it proceeds to Step 912.

(Step 912) The unloader raises the DECREMENT signal, causing the BYTE COUNT register 80 to be decremented to reflect the number of data bytes that have been transferred.

(Step 913) The FIRST BLOCK signal is then set to zero.

(Step 914) The unloader then checks whether the BYTE COUNT is now zero (i.e. LAST BLOCK is true and REMAINDER is false). If so, the unloader proceeds to Step 915. Otherwise, the unloader returns to Step 903 above, so as to load the next block into the overwrite buffer.

(Step 915) The FIFO's BUFFER READY flag is reset to 0, to indicate that all the data in the FIFO buffer has now been transferred to the MBus store. The unloader then returns to Step 901, to prepare for the next block.

Some Possible Modifications

It will be appreciated that many modifications may be made to the system described above without departing from the scope of the present invention. For example, different buffer sizes, block sizes and bus widths may be used.

Instead of using an MBus to interconnect the processing units, other forms of bus may be used, such as a HyperMBus.

In another possible modification, rather than the INC processor polling the BUFFER READY flag, an interrupt may be used to flag "buffer available".

I claim:

1. Apparatus for realigning a sequence of data bytes, the apparatus comprising:

(a) a FIFO buffer, having a plurality of lanes with a particular lane order, each of said lanes comprising a sequence of byte locations;

(b) means for writing successive groups of said data bytes in parallel into the lanes of the FIFO buffer, and for pre-skewing the bytes in each lane by a controllable number of byte locations, using a destination address value, supplied with said data, to determine said controllable number of byte locations;

(c) means for reading data in parallel out of the lanes of the FIFO buffer; and (d) lane changing means for controllably rotating the lane order of data read from the FIFO buffer, using said destination address value to control rotation of said lane order.

2. Apparatus according to claim 1 further including:

(a) an overwrite buffer for receiving a block of data from the lane changing means;

(b) a write buffer for receiving existing contents of a data block; and (c) overwrite control means for overwriting a selected portion of the write buffer with the contents of the overwrite buffer.

3. Apparatus according to claim 1, wherein said means for writing includes a plurality of write pointers, for addressing respective lanes of said FIFO buffer; and wherein said means for reading comprises a read pointer, for addressing all the lanes of said FIFO buffer in parallel.

4. Apparatus according to claim 3, wherein said means for writing further includes a pre-skew control circuit for generating a plurality of pre-skew values, and for writing said pre-skew values into said write pointers.

5. A data processing system comprising a plurality of data processing elements interconnected by an inter-processor network, wherein each of the data processing elements includes means for receiving a sequence of data bytes from the network, a memory, and data realignment apparatus comprising:

(a) a FIFO buffer, having a plurality of lanes with a particular lane order, each of said lanes comprising a sequence of byte locations;

(b) means for writing successive groups of said data bytes in parallel into the lanes of the FIFO buffer, and for pre-skewing the bytes in each lane by a controllable number of byte locations, using a destination address value, received from the network along with said data, to determine said controllable number of byte locations;

(c) means for reading data in parallel out of the lanes of the FIFO buffer;

(d) lane changing means for controllably rotating the lane order of data read from the FIFO buffer, using said destination address value to control rotation of the lane order; and (e) means for writing data from said lane changing means into said memory.

6. Apparatus according to claim 5, wherein said means for writing data from said lane changing means into said memory comprises:

(a) an overwrite buffer for receiving a block of data from the lane changing means;

(b) a write buffer for receiving existing contents of a data block from said memory;

(c) overwrite control means for overwriting a selected portion of the write buffer with the contents of the overwrite buffer; and (d) means for writing the contents of said write buffer into said memory.

7. Apparatus according to claim 5 wherein said memory comprises a cache memory, and wherein said blocks correspond to cache lines.

8. A method of realigning a sequence of data bytes, comprising the steps:

(a) writing successive groups of said data bytes in parallel into a multi-lane FIFO buffer with a particular lane order, each of said lanes comprising a sequence of byte locations, with the bytes in each lane pre-skewed by a controllable number of byte locations determined by a destination address value, received along with said data;

(b) reading data in parallel out of the lanes of the FIFO buffer; and (c) controllably rotating the lane order of data read from the FIFO buffer, using said destination address to control rotation of said lane order.

9. A method according to claim 8 further including the steps:

(a) writing a block of data from the lane changing means into an overwrite buffer;

(b) writing existing contents of a data block into a write buffer; and (c) overwriting a selected portion of the write buffer with the contents of the overwrite buffer.

* * * * *